J. F. HAWORTH.
CAMERA.
APPLICATION FILED AUG. 30, 1917.

1,283,172.

Patented Oct. 29, 1918.
2 SHEETS—SHEET 1.

WITNESSES
Charles Livingstone
Nelson Densmore

INVENTOR
J. F. Haworth,
by Bakewell, Byrnes & Parmelee,
Attys.

J. F. HAWORTH.
CAMERA.
APPLICATION FILED AUG. 30, 1917.

1,283,172.

Patented Oct. 29, 1918.
2 SHEETS—SHEET 2.

WITNESSES
Charles Livingstone
Nelson Densmore

INVENTOR
J. F. Haworth
by Bakewell, Byrnes & Parmelee,
Attys

UNITED STATES PATENT OFFICE.

JEHU FREDERIC HAWORTH, OF EDGEWORTH, PENNSYLVANIA.

CAMERA.

1,283,172.   Specification of Letters Patent.   Patented Oct. 29, 1918.

Application filed August 30, 1917. Serial No. 189,018.

*To all whom it may concern:*

Be it known that I, JEHU FREDERIC HAWORTH, a citizen of the United States, residing at Edgeworth, Allegheny county, Pennsylvania, have invented a new and useful Improvement in Cameras, of which the following is a full, clear, and exact description, reference being had to the accompanying drawings, forming part of this specification, in which—

This invention relates to an improvement in cameras for marking photographs. One of the objects of my invention is to provide a cheap and efficient device which is arranged to place the desired markings on the different negatives at the time of exposure, and which markings may be of any desired character.

It is well known to those familiar with the art that when taking topographic photographs from an aeroplane or a captive balloon, it is desirable to mark one or more of the points of the compass on the negative, so that the points of the compass can be readily ascertained after the prints have been made. It is also desirable to indicate on the negative the elevation from which such an exposure was made, as well as indicating the time of day the exposure was made.

With my improved apparatus I am enabled to readily place these markings on the negative at the time of exposure in such a manner as to form a permanent record.

The precise nature of my invention will be best understood by reference to the accompanying drawings, which will now be described, it being premised, however, that various changes may be made in the details of construction of the apparatus, without departing from the spirit and scope of my invention as set forth in the appended claims.

Figure 1:
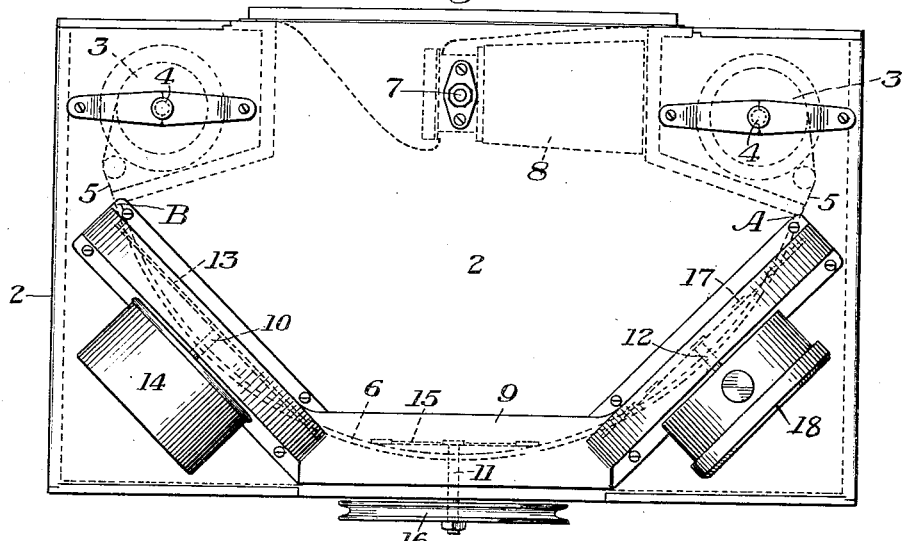
Figure 1 is a side elevation of one form of camera.
Figure 2:
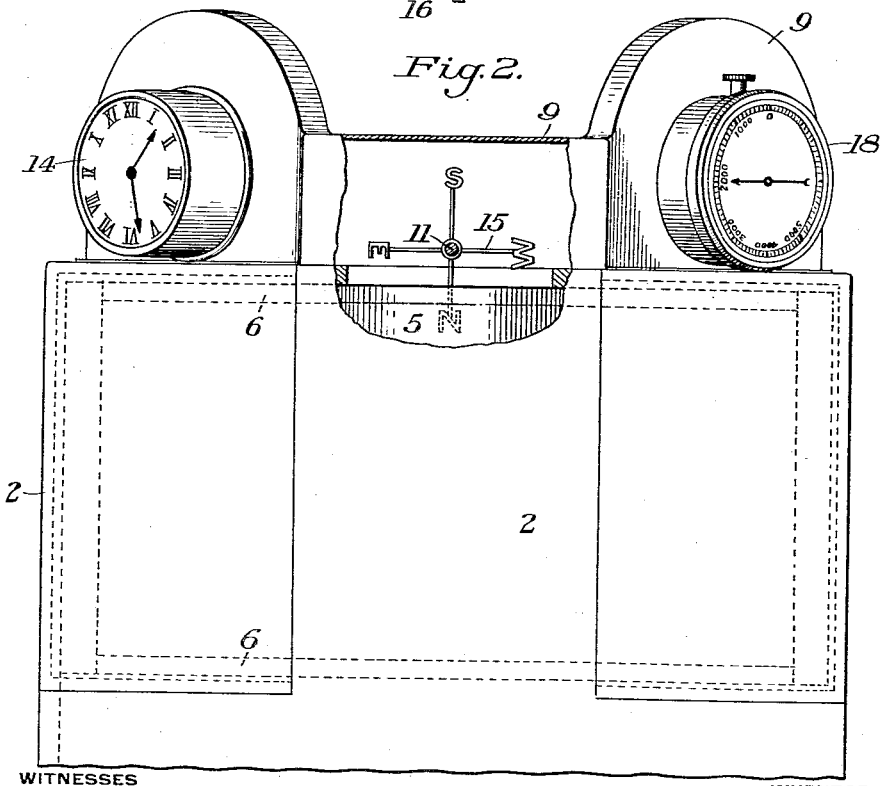
Fig. 2 is a plan view thereof partially in section.

Referring to the accompanying drawings in which I have shown one form of apparatus, the reference character 2 designates the box of a panoramic camera, and rotatably mounted therein are film spools 3, which are journaled in suitable bearings 4. The film 5 passes from one spool to the other about the usual semi-annular guides 6, the exposure on the film being made from the point A to the point B, or from the point B to the point A. Mounted so as to oscillate in the box of the camera about the pivot pin 7 is a lens carrier 8, which is arranged to swing 180° from the position shown in Fig. 1 when taking a photograph.

Figure 3:
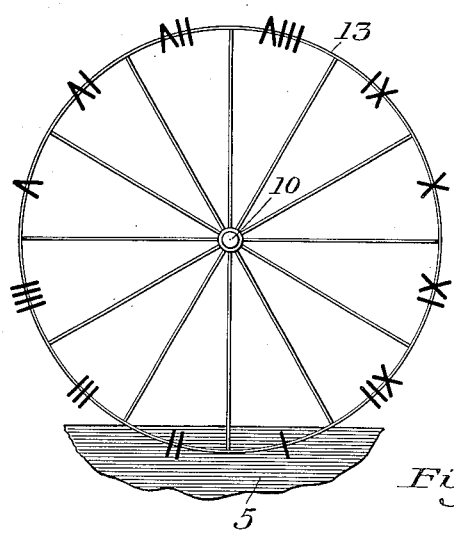
Figs. 3, 4 and 5 are face views of different forms of marking devices.

The lens carrier 8, as well as the film spools 3, may be connected to each other in any desired manner for operating them during the taking of the photographs. Mounted on the side of the box 2 is a casing 9, and journaled in said casing are shafts 10, 11 and 12. The end of the shaft 10 is provided with a marking device 13, which is clearly shown in Fig. 3, of the drawings, a portion thereof extending over the margin of the film 5 between the film and the lens, as clearly shown in Fig. 3. This marking device is provided with numerals from 1 to 12, and is arranged to be rotated by means of a clock 14 mounted on the face of the casing 9, so that the approximate time of making the exposure will be indicated in white letters on the edge of the negative.

Connected to the outer end of the shaft 11 is a second marking device 15, having four reference characters, namely, N. E. S. and W., for indicating the points of the compass. This marking device is also arranged to rotate between the face of the film or plate and the lens, so as to print the points of the compass on the exposure when made. The outer end of this shaft 11 is provided with a wheel 16, which may be manipulated by hand, in accordance with the points of the compass, or if used in connection with an airship, the wheel may be connected by means of a belt or in any other desired manner with a device under the control of one of the operators, so that the marking device 15 may be moved to correspond with the needle of a compass.

Figure 4:
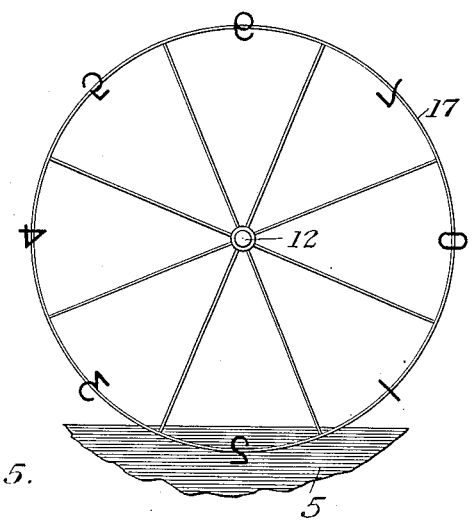
Figure 5:
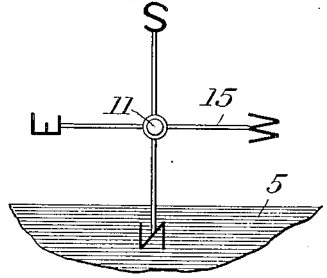

In Fig. 4 I have shown a marking device 17, such as is connected to the end of the shaft 12, which is provided with proper designating or marking characters for printing the elevation on the film 5, and which is arranged to be rotated by means of an aneroid barometer 18 or any other suitable device.

Figure 6:
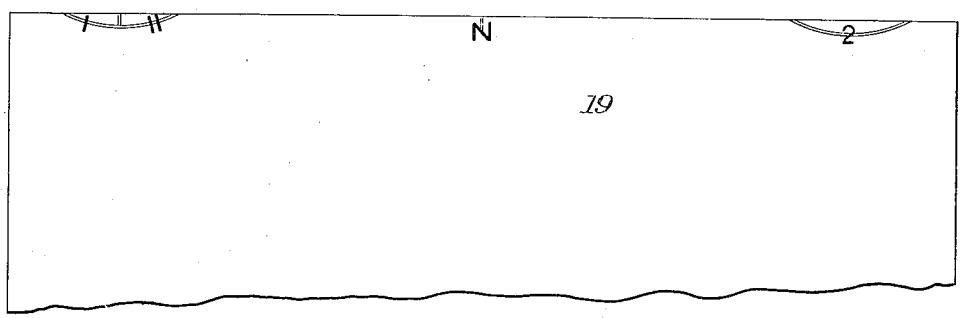
Fig. 6 is a face view of a photograph on which the different marks have been printed.

The prints made from negatives provided with marking devices such as above described will have clearly printed thereon the indicating characters in a manner similar to those shown on the print 19 in Fig. 6.

In the foregoing specification I have described the apparatus in connection with a panoramic camera, but it will be readily understood by those familiar with the art that the device is applicable to all forms of cameras.

The advantages of my invention result from the provision of a device for making a permanent record on the negative during the exposure thereof, and which means is arranged to be shifted to vary the markings on the individual exposures, together with means for automatically actuating one or more of the marking devices, in order to automatically vary the markings in accordance with the different conditions.

I claim:

1. A camera having a lens, a support for a sensitized element, a light proof frame connected to the camera, a shaft rotatably mounted in said frame, designating characters on said shaft arranged to be moved through an opening in the camera to a point between the lens and the sensitized element, said shaft extending through an opening in its frame, and a rotating member on the end of the said shaft, substantially as described.

2. A camera having a lens, a support for a sensitized element, a rotatable shaft having an outwardly extending end, designating characters connected to said shaft arranged to be moved between the lens and the sensitized element, and a pulley connected to the end of said shaft on the exterior of the camera arranged to actuate the designating characters within the camera, substantially as described.

3. A camera having a lens, a light tight frame or casing connected to said camera, a plurality of shafts rotatably mounted in said casing, each of said shafts having designating characters thereon arranged to be moved between the lens and the sensitized element, one end of each of said shafts extending through the casing, and an actuating member on the end of each shaft, substantially as described.

In testimony whereof, I have hereunto set my hand.

JEHU FREDERIC HAWORTH.